United States Patent
Zhang et al.

(10) Patent No.: US 10,873,413 B2
(45) Date of Patent: Dec. 22, 2020

(54) APPARATUS AND METHOD FOR LINK ADAPTATION IN UPLINK GRANT-LESS RANDOM ACCESS

(71) Applicant: Huawei Technologies Co., Ltd., Shenzhen (CN)

(72) Inventors: Liqing Zhang, Ottawa (CA); Kelvin Kar Kin Au, Kanata (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/194,972

(22) Filed: Nov. 19, 2018

(65) Prior Publication Data
US 2019/0089480 A1  Mar. 21, 2019

Related U.S. Application Data (63) Continuation of application No. 14/724,569, filed on May 28, 2015, now Pat. No. 10,135,562.

(51) Int. Cl.
| | |
|---|---|
| H04L 1/00 | (2006.01) |
| H04L 5/00 | (2006.01) |
| H04W 74/08 | (2009.01) |

(52) U.S. Cl.
CPC .......... *H04L 1/0003* (2013.01); *H04L 1/0009* (2013.01); *H04L 1/0025* (2013.01);
(Continued)

(58) Field of Classification Search
CPC ... H04L 1/0002; H04L 1/0003; H04L 1/0009; H04L 1/0015; H04L 1/0016;
(Continued)

(56) References Cited

U.S. PATENT DOCUMENTS

| | | |
|---|---|---|
| 6,307,865 B1 | 10/2001 | Ogasawara et al. |
| 6,377,817 B1 | 4/2002 | Hakaste et al. |

(Continued)

FOREIGN PATENT DOCUMENTS

| | | |
|---|---|---|
| CA | 2931664 A1 | 7/2015 |
| CN | 101207461 A | 6/2008 |

(Continued)

OTHER PUBLICATIONS

Mohammed, S., et al., "Constant-Envelope Multi-User Precoding for Frequency-Selective Massive MIMO Systems," IEEE Wireless Communications Letters, vol. 2, No. 5, Oct. 2013, pp. 547-550.
(Continued)

*Primary Examiner* — Eric Nowlin
(74) *Attorney, Agent, or Firm* — Slater Matsil, LLP (57) ABSTRACT

Embodiments are provided for a scheme of link adaptation (LA) in uplink grant-less random access (RA) communications. The scheme includes changing a modulation and coding (MCS) of a user, instead of using a fixed MCS over time, as the user link, channel, or non-link conditions vary during the RA communications. In an embodiment, a transmission point (TP) receives from a UE a packet encoded using a MCS, and detects a condition associated with uplink measurements or other non-link based condition of the UE. The TP then initiates an upgrade or a downgrade of the MCS in accordance with the condition, and signals the UE indicating a second MCS as a result. The UE thus sends a second packet encoded using the second MCS. In another embodiment, the UE initiates the MCS change in accordance to detecting a link or non-link based condition, such as change of mobility.

21 Claims, 6 Drawing Sheets

(52) U.S. Cl.
CPC ............ *H04L 5/006* (2013.01); *H04L 5/0057*
(2013.01); *H04L 1/0016* (2013.01); *H04W*
*74/0833* (2013.01); *Y02D 50/10* (2018.01)

(58) Field of Classification Search
CPC ... H04L 1/0021; H04L 1/0022; H04L 1/0026;
H04L 5/0057; H04L 5/006; H04L
25/4917; H04W 74/0833
See application file for complete search history.

(56) References Cited

U.S. PATENT DOCUMENTS

| | | |
|---|---|---|
| 6,587,697 B2 | 7/2003 | Terry et al. |
| 6,782,269 B2 | 8/2004 | Toskala et al. |
| 7,366,464 B2 | 4/2008 | Iacono et al. |
| 7,558,289 B1 | 7/2009 | Bidichandani et al. |
| 7,613,157 B2 | 11/2009 | Pan et al. |
| 7,613,475 B2 | 11/2009 | Song et al. |
| 7,702,031 B2 | 4/2010 | Dunn et al. |
| 7,729,373 B2 | 6/2010 | Dale et al. |
| 7,898,948 B2 | 3/2011 | DiGirolamo et al. |
| 8,077,782 B2 | 12/2011 | Onodera et al. |
| 8,185,064 B2 | 5/2012 | Nogami et al. |
| 8,190,092 B1* | 5/2012 | Lee ................. H04L 1/0003 370/342 |
| 8,248,981 B2 | 8/2012 | Warner et al. |
| 8,270,500 B2* | 9/2012 | Tidestav ............ H04L 1/0019 370/252 |
| 8,355,677 B1* | 1/2013 | Lee ................. H04L 1/0003 370/342 |
| 8,488,461 B2 | 7/2013 | Pan et al. |
| 8,559,943 B2 | 10/2013 | Bidichandani et al. |
| 8,582,522 B2 | 11/2013 | Earnshaw et al. |
| 8,711,789 B2* | 4/2014 | Ratasuk ............ H04W 74/0866 370/329 |
| 8,712,333 B1* | 4/2014 | Lee ................. H04L 1/0003 370/342 |
| 8,724,556 B2 | 5/2014 | McCoy et al. |
| 8,868,125 B2 | 10/2014 | Bonneville et al. |
| 8,964,658 B2* | 2/2015 | Chen ................ H04W 74/0841 370/329 |
| 8,971,256 B2 | 3/2015 | Bracha |
| 8,971,815 B1* | 3/2015 | Lee ................. H04L 1/0003 370/342 |
| 9,026,051 B2 | 5/2015 | Etemad et al. |
| 9,131,502 B2* | 9/2015 | Li ................... H04W 74/0866 |
| 9,137,813 B2 | 9/2015 | Terry et al. |
| 9,178,666 B2 | 11/2015 | Park et al. |
| 9,210,699 B2 | 12/2015 | McCoy et al. |
| 9,319,928 B2* | 4/2016 | Bertrand ............ H04L 1/0009 |
| 9,391,914 B2 | 7/2016 | Van Wyk |
| 9,420,530 B1 | 8/2016 | Duxbury et al. |
| 9,444,662 B2 | 9/2016 | Imamura et al. |
| 9,485,776 B2 | 11/2016 | Park et al. |
| 9,509,440 B2* | 11/2016 | Hammarwall ........ H04L 1/0003 |
| 9,609,520 B2 | 3/2017 | Shellhammer et al. |
| 9,736,774 B2 | 8/2017 | Au et al. |
| 9,743,423 B2* | 8/2017 | Liu .................. H04L 1/0009 |
| 9,750,056 B2 | 8/2017 | Au et al. |
| 9,806,932 B2 | 10/2017 | Zhang et al. |
| 9,844,073 B2* | 12/2017 | Ray .................. H04W 74/006 |
| 9,883,404 B2 | 1/2018 | Malladi et al. |
| 9,967,900 B2 | 5/2018 | He et al. |
| 9,979,527 B2 | 5/2018 | Jhang et al. |
| 10,009,907 B2* | 6/2018 | Jeon ................ H04L 1/0003 |
| 10,038,484 B2* | 7/2018 | Davydov ........... H04B 7/0413 |
| 10,200,907 B2* | 2/2019 | Gandhi .............. H04L 47/38 |
| 10,305,627 B2* | 5/2019 | Li .................... H04L 1/0003 |
| 10,609,724 B2* | 3/2020 | Liu .................. H04W 72/1268 |
| 10,624,048 B2* | 4/2020 | Hu ................... H04W 52/34 |
| 2002/0168944 A1 | 11/2002 | Terry et al. |
| 2003/0045307 A1* | 3/2003 | Arviv ................ H04L 1/20 455/464 |
| 2003/0232601 A1 | 12/2003 | Uno |
| 2003/0232624 A1 | 12/2003 | Toskala et al. |
| 2004/0038697 A1 | 2/2004 | Attar et al. |
| 2004/0103278 A1 | 5/2004 | Abhishek et al. |
| 2004/0185788 A1 | 9/2004 | Terry et al. |
| 2004/0185789 A1 | 9/2004 | Terry et al. |
| 2005/0002366 A1 | 1/2005 | Toskala et al. |
| 2005/0025254 A1 | 2/2005 | Awad et al. |
| 2005/0047366 A1 | 3/2005 | Ghosh et al. |
| 2005/0122928 A1 | 6/2005 | Vijayan et al. |
| 2005/0159166 A1 | 7/2005 | Jonsson et al. |
| 2005/0169391 A1 | 8/2005 | Takeda et al. |
| 2005/0195908 A1 | 9/2005 | Dunn et al. |
| 2005/0250528 A1 | 11/2005 | Song et al. |
| 2005/0285803 A1 | 12/2005 | Iacono et al. |
| 2006/0009229 A1 | 1/2006 | Yuan et al. |
| 2006/0107164 A1* | 5/2006 | Baer ................. H04L 1/0002 714/748 |
| 2006/0268976 A1* | 11/2006 | Baum ................ H04L 1/0003 375/239 |
| 2007/0066242 A1 | 3/2007 | Yi et al. |
| 2007/0275665 A1* | 11/2007 | Molnar .............. H04L 1/0002 455/67.13 |
| 2007/0293276 A1 | 12/2007 | Ushijima |
| 2008/0004032 A1 | 1/2008 | Lironi et al. |
| 2008/0095185 A1 | 4/2008 | DiGirolamo et al. |
| 2008/0137562 A1* | 6/2008 | Li .................... H04B 7/2656 370/280 |
| 2008/0159431 A1 | 7/2008 | Obuchi et al. |
| 2008/0233964 A1 | 9/2008 | McCoy et al. |
| 2009/0023392 A1 | 1/2009 | Iizuka et al. |
| 2009/0103483 A1 | 4/2009 | Higuchi et al. |
| 2009/0232082 A1 | 9/2009 | Bidichandani et al. |
| 2009/0239560 A1 | 9/2009 | Nakamura |
| 2009/0258665 A1* | 10/2009 | Bourlas ............. H04L 1/0003 455/522 |
| 2010/0009689 A1 | 1/2010 | Jalloul et al. |
| 2010/0023830 A1 | 1/2010 | Wengerter et al. |
| 2010/0232526 A1* | 9/2010 | Tidestav ............ H04L 1/0019 375/259 |
| 2010/0265895 A1 | 10/2010 | Bracha |
| 2010/0309793 A1 | 12/2010 | Choi et al. |
| 2011/0064167 A1 | 3/2011 | Rezk et al. |
| 2011/0070836 A1 | 3/2011 | Park et al. |
| 2011/0124357 A1* | 5/2011 | Kim ................... H04L 1/0015 455/507 |
| 2011/0176464 A1 | 7/2011 | Warner et al. |
| 2011/0222415 A1* | 9/2011 | Ramamurthi ......... H04L 1/0003 370/252 |
| 2011/0243080 A1* | 10/2011 | Chen ................ H04W 74/0841 370/329 |
| 2011/0255469 A1 | 10/2011 | Kishiyama et al. |
| 2011/0274054 A1 | 11/2011 | Cordeiro |
| 2011/0310800 A1 | 12/2011 | Lin et al. |
| 2012/0014269 A1* | 1/2012 | Ray ................... H04W 74/006 370/252 |
| 2012/0020281 A1 | 1/2012 | Nakamura |
| 2012/0044877 A1 | 2/2012 | Ratasuk et al. |
| 2012/0044878 A1* | 2/2012 | Ratasuk ............ H04W 74/0866 370/329 |
| 2012/0088531 A1 | 4/2012 | Bonneville et al. |
| 2012/0147831 A1* | 6/2012 | Golitschek ......... H04L 1/0026 370/329 |
| 2012/0157141 A1* | 6/2012 | Lim .................. H04W 74/08 455/509 |
| 2012/0170514 A1 | 7/2012 | Lo et al. |
| 2012/0269156 A1 | 10/2012 | Quan et al. |
| 2013/0016670 A1 | 1/2013 | Shellhammer et al. |
| 2013/0083737 A1 | 4/2013 | Earnshaw et al. |
| 2013/0107838 A1* | 5/2013 | Li .................... H04L 72/0453 370/329 |
| 2013/0142038 A1 | 6/2013 | Pan et al. |
| 2013/0148611 A1 | 6/2013 | Moulsley et al. |
| 2013/0163535 A1 | 6/2013 | Anderson et al. |
| 2013/0182592 A1 | 7/2013 | Calcev et al. |
| 2014/0034845 A1 | 2/2014 | Parker |
| 2014/0036808 A1 | 2/2014 | Pelletier et al. |
| 2014/0064120 A1* | 3/2014 | Sethuraman ......... H04W 24/02 370/252 |

(56) References Cited

U.S. PATENT DOCUMENTS

| | | | |
|---|---|---|---|
| 2014/0079005 A1 | 3/2014 | McCoy et al. | |
| 2014/0094122 A1 | 4/2014 | Etemad et al. | |
| 2014/0122956 A1 | 5/2014 | Yun et al. | |
| 2014/0140313 A1* | 5/2014 | Liu | H04L 1/0002 370/329 |
| 2014/0169195 A1 | 6/2014 | Hsin et al. | |
| 2014/0192732 A1* | 7/2014 | Chen | H04L 1/0003 370/329 |
| 2014/0192767 A1 | 7/2014 | Au et al. | |
| 2014/0254544 A1 | 9/2014 | Kar et al. | |
| 2014/0257195 A1 | 9/2014 | Kjeldsen et al. | |
| 2014/0321292 A1 | 10/2014 | Yokoyama | |
| 2014/0362780 A1 | 12/2014 | Malladi et al. | |
| 2015/0063340 A1 | 3/2015 | Cai et al. | |
| 2015/0078256 A1 | 3/2015 | Van Wyk | |
| 2015/0195788 A1 | 7/2015 | Au et al. | |
| 2015/0195819 A1 | 7/2015 | Kwon et al. | |
| 2015/0326415 A1 | 11/2015 | Imamura et al. | |
| 2015/0381310 A1* | 12/2015 | Hammarwall | H04L 1/0003 370/329 |
| 2016/0014817 A1 | 1/2016 | Cave et al. | |
| 2016/0029400 A1 | 1/2016 | Park et al. | |
| 2016/0044645 A1 | 2/2016 | Noh et al. | |
| 2016/0057735 A1 | 2/2016 | Liu et al. | |
| 2016/0057747 A1 | 2/2016 | Jhang et al. | |
| 2016/0135211 A1 | 5/2016 | Panigrahi et al. | |
| 2016/0142292 A1 | 5/2016 | Au et al. | |
| 2016/0150551 A1 | 5/2016 | Terry et al. | |
| 2016/0156673 A1 | 6/2016 | Emmanuel et al. | |
| 2016/0182183 A1 | 6/2016 | Wang et al. | |
| 2016/0219627 A1 | 7/2016 | Au et al. | |
| 2016/0227481 A1 | 8/2016 | Au et al. | |
| 2016/0254920 A1* | 9/2016 | Davydov | H04B 7/0413 370/312 |
| 2016/0262170 A1 | 9/2016 | Lee et al. | |
| 2016/0269212 A1 | 9/2016 | Vilaipornsawai et al. | |
| 2016/0269218 A1 | 9/2016 | Zhang et al. | |
| 2016/0270102 A1* | 9/2016 | Zeng | H04W 72/048 |
| 2016/0323911 A1 | 11/2016 | Au et al. | |
| 2016/0337150 A1* | 11/2016 | Larsson | H04L 1/0025 |
| 2016/0352454 A1 | 12/2016 | Zhang et al. | |
| 2016/0353374 A1 | 12/2016 | Hoglund et al. | |
| 2016/0353453 A1 | 12/2016 | Au et al. | |
| 2016/0381368 A1 | 12/2016 | Liao et al. | |
| 2017/0026976 A1 | 1/2017 | Yoo et al. | |
| 2017/0034845 A1* | 2/2017 | Liu | H04W 24/08 |
| 2017/0034847 A1 | 2/2017 | He et al. | |
| 2017/0070793 A1 | 3/2017 | Liu | |
| 2017/0078003 A1 | 3/2017 | Ghosh et al. | |
| 2017/0078045 A1* | 3/2017 | Hammarwall | H04L 1/0003 |
| 2017/0127435 A1 | 5/2017 | Rong et al. | |
| 2017/0180102 A1* | 6/2017 | Kang | H04W 24/08 |
| 2017/0215181 A1 | 7/2017 | McCoy et al. | |
| 2017/0223712 A1 | 8/2017 | Stephens et al. | |
| 2017/0245140 A1 | 8/2017 | Au et al. | |
| 2017/0272963 A1 | 9/2017 | Rengarajan et al. | |
| 2017/0288817 A1 | 10/2017 | Cao et al. | |
| 2017/0289968 A1 | 10/2017 | Marco | |
| 2017/0290052 A1 | 10/2017 | Zhang et al. | |
| 2017/0310431 A1 | 10/2017 | Iyer et al. | |
| 2017/0311182 A1 | 10/2017 | Tenny et al. | |
| 2017/0311278 A1 | 10/2017 | Adjakple et al. | |
| 2017/0318530 A1 | 11/2017 | Au et al. | |
| 2017/0318598 A1 | 11/2017 | Islam et al. | |
| 2017/0318604 A1* | 11/2017 | Liu | H04L 1/0003 |
| 2018/0027452 A1 | 1/2018 | Tanaka | |
| 2018/0027582 A1 | 1/2018 | Yerramalli et al. | |
| 2018/0035331 A1 | 2/2018 | Sundman et al. | |
| 2018/0035406 A1* | 2/2018 | Hao | H04L 5/0007 |
| 2018/0102865 A1 | 4/2018 | Li et al. | |
| 2018/0103487 A1 | 4/2018 | Asterjadhi et al. | |
| 2018/0115934 A1 | 4/2018 | Chen et al. | |
| 2018/0242309 A1* | 8/2018 | Au | H04L 1/0045 |
| 2018/0263002 A1* | 9/2018 | Hu | H04L 5/001 |
| 2019/0190644 A1* | 6/2019 | Ugurlu | H04W 72/042 |
| 2019/0222462 A1* | 7/2019 | Nammi | H04L 1/0003 |
| 2019/0253121 A1* | 8/2019 | Islam | H04B 7/0626 |
| 2019/0260451 A1* | 8/2019 | Sarkis | H04B 7/0486 |
| 2019/0260495 A1* | 8/2019 | Nammi | H04L 1/0003 |
| 2020/0028609 A1* | 1/2020 | Ahn | H04W 24/10 |

FOREIGN PATENT DOCUMENTS

| | | | | |
|---|---|---|---|---|
| CN | 102223699 A | 10/2011 | | |
| CN | 104243104 A | 12/2014 | | |
| CN | 104507170 A | 4/2015 | | |
| EP | 2220796 A1 * | 8/2010 | | H04L 1/0019 |
| EP | 3092762 A1 | 11/2016 | | |
| EP | 3200370 A1 | 8/2017 | | |
| EP | 3266242 A1 | 1/2018 | | |
| JP | 2013516815 A | 5/2013 | | |
| KR | 20060107791 A | 10/2006 | | |
| KR | 20090109699 A | 10/2009 | | |
| KR | 20090118079 A | 11/2009 | | |
| KR | 20140083945 A | 7/2014 | | |
| RU | 2013151005 A | 5/2015 | | |
| WO | 03003643 A1 | 1/2003 | | |
| WO | WO-2009075617 A1 * | 6/2009 | | H04L 1/0019 |
| WO | 2011120443 A1 | 10/2011 | | |
| WO | 2012088579 A1 | 7/2012 | | |
| WO | 2014047773 A1 | 4/2014 | | |
| WO | 2014090200 A1 | 6/2014 | | |
| WO | 2014135126 A1 | 9/2014 | | |
| WO | 2014147479 A2 | 9/2014 | | |
| WO | 2015103630 A1 | 7/2015 | | |
| WO | 2015131727 A1 | 11/2015 | | |
| WO | 2016140602 A1 | 9/2016 | | |
| WO | 2016148817 A1 | 9/2016 | | |
| WO | 2016186540 A1 | 11/2016 | | |
| WO | 2018032014 A1 | 2/2018 | | |
| WO | WO-2019139734 A1 * | 7/2019 | | H04L 27/3488 |

OTHER PUBLICATIONS

Ramamurthi, V. et al., "Mobility Based MIMO Link Adaptation in LTS-Advanced Cellular Networks", International Conference on Broadband, Wireless Computing, Communications and Applications, Nov. 2010, 7 pages.

Sun, Q et al., "Software Defined Air Interface: A Framework of 5G Air Interface", 2015 IEEE Wireless Communications and Networking Conference (WCNC)—Workshops—5G Architecture, Mar. 2015 , 6 Pages, New Orleans, LA.

Taherzadeh, M et al., "SCMA Codebook Design", 2014 IEEE 80th Vehicular Technology Conference, Sep. 2014, 5 pages, Vancouver, BC, Canada.

Rahmatallah, Y., et al., "Peak-To-Average Power Ratio Reduction in OFDM Systems: A Survey and Taxonomy," IEEE Communications Surveys & Tutorials, vol. 15, No. 4, Fourth Quarter 2013, pp. 1567-1592.

Studer, C., et al., PAR-aware multi-user precoder for the large-scale MIMO-OFDM downlink, 2012 International Symposium on Wireless Communication Systems (ISWCS), Aug. 28-31, 2012, pp. 806-810.

NTT Docomo et al., "Link Adaptation Scheme for Single-antenna Transmission in E-UTRA Downlink", 3GPP TSG-RAN WG1 Meeting #44, R1-060306, Feb. 13-17, 2006, 7 pages, Denver, USA.

* cited by examiner

APPARATUS AND METHOD FOR LINK ADAPTATION IN UPLINK GRANT-LESS RANDOM ACCESS

This application is a continuation of U.S. application Ser. No. 14/724,569 filed on May 28, 2015 and entitled, "Apparatus and Method for Link Adaptation in Uplink Grant-less Random Access," which application is hereby incorporated by reference herein in its entirety.

TECHNICAL FIELD

The present invention relates to wireless communications, and, in particular embodiments, to an apparatus and method for link adaptation in uplink grant-less random access.

BACKGROUND

In evolving and next generation wireless networks, an uplink grant-less random access (RA) scheme can be employed to reduce signaling overhead and support traffic and applications with stringent latency requirements. For example, for applications such as gaming, or real time video streaming, real-time streams require very low latency and reliable transmissions. For the random access scheme in uplink, sparse-code-multiple access (SCMA) technology can be used for overloading traffic where multiple users can share the same radio resources simultaneously. A fixed modulation and coding scheme (MCS) such as Quadrature Phase Shift Keying (QSPK) is also used in order to achieve more reliable communications. In many conventional Radio Access Networks (RANs), a random access channel is used by a terminal to request a scheduled transmission slot. As a result, communications over the random access channel tend to be very short, and use of a robust MCS is favored to afford a maximum likelihood of transmission success. There has been increased interest in the use of the random access channels for data transmissions. However, the use of a very robust MCS may not always be necessary, and when it is not necessary it contributes to a reduction in the efficient use of the spectrum. At present, there is no mechanism to allow for increased efficiency in the random access data communication. To support more users, more aggressive modulation and coding schemes (MCSs) may be beneficial for user equipment (UE) such as when the UE has proper channel conditions or location/geometry in the network. Therefore, there is a need for a link adaptation (LA) scheme for uplink grant-less RA according to such conditions.

SUMMARY

In accordance with an embodiment, a method for random access link adaptation in wireless networks includes receiving, by a transmission point (TP) from a user equipment (UE), a first packet encoded using a modulation and coding scheme (MCS) pre-assigned for the UE, and detecting a link adaptation (LA) condition associated with uplink long-term (LT) measurements of the UE upon receiving the first packet. The method further includes performing one of an upgrade and a downgrade of the MCS for contention based grant-less transmission in accordance with the LA condition, and signaling the UE indicating a second MCS as a result of the upgrade or downgrade. A second packet encoded using the second MCS is then received from the UE.

In accordance with another embodiment, a method for random access link adaptation in wireless networks includes transmitting, by a UE to a TP, a first packet encoded using a first MCS pre-assigned for the UE, detecting a LA condition associated with UE transmission or application quality upon receiving the first packet, and initiating a downgrade of the first MCS for contention based grant-less transmission in accordance with the LA condition. The method further includes receiving, from the TP, a signaling indicating a second MCS as a result of the downgrade. The second MCS is a more robust MCS than the first MCS. A second packet encoded using the second MCS is then sent to the TP.

In accordance with another embodiment, a network component comprises at least one processor and a non-transitory computer readable storage medium storing programming for execution by the at least one processor. The programming includes instructions to receive from a UE, a first packet encoded using a MCS, detect a LA condition associated with an uplink measurement of the UE upon receiving the first packet, and perform one of an upgrade and a downgrade of the MCS in accordance with the LA condition. The programming includes further instructions to signal the UE indicating a second MCS as a result of the upgrade or downgrade, and receive, from the UE, a second packet encoded using the second MCS.

In accordance with another embodiment, a UE comprises at least one processor and a non-transitory computer readable storage medium storing programming for execution by the at least one processor. The programming includes instructions to transmit, to a TP, a first packet encoded using a first MCS, detect a LA condition associated with the UE upon receiving the first packet, and initiate a downgrade of the first MCS in accordance with the LA condition. The programming includes further instructions to receive, from the TP, a signaling indicating a second MCS as a result of the downgrade, wherein the second MCS is a more robust MCS than the first MCS, and send, to the UE, a second packet encoded using the second MCS.

In accordance with yet another embodiment, a method performed at a node participating in a grant free wireless communication where an entity uses a MCS for transmissions includes determining, in accordance with a non-link based factor, to switch from a current MCS to a new MCS, and instructing a grant free transmission controller to use the new MCS for subsequent grant free transmissions.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

System and method embodiments are provided herein for a scheme of link adaptation in uplink grant-less random access (RA). The scheme includes changing the MCS assigned to a user equipment (UE), instead of using a fixed MCS scheme (e.g., typically a robust one such as QSPK), as the UE link/channel conditions vary during the RA communications. The methods and systems disclosed herein perform link adaptation based on uplink measurements and long-term measurements of signal quality for a UE. As used herein, the term UE represents any device capable of connecting to a wireless network, including user operated devices (e.g., smartphones) and machine-to-machine communications (M2M) devices such as sensor devices. The UE starts transmissions with a defined robust MCS, and after the channel has demonstrated sufficient signal quality, e.g., according to predefined thresholds and criteria, a less robust MCS is applied. This process of channel evaluation and application of successively less robust MCS can be repeated until a sufficiently robust MCS is selected. This iterative process is referred to herein as slow link adaptation (LA). To obtain channel measurements, a channel quality indicator (CQI) value on the uplink (UL) channel associated with the UE can be measured by a transmission point (TP), e.g., a base station (BS) or evolved node-B (eNB). Power control for RA can also be used for grant-less scheduling. The TP modifies the MCS for the UE, as needed according to various criteria and scenarios, based on long-term Power Control (PC), and notifies the UE of such change. The adaptation can also be carried out so that it provides support of stout channel (SC) and retransmission (ReTx) protocol for more efficient retransmission and UE detection for grant-less RA communications. The MCS can be upgraded (by switching to less robust MCS suitable for better signal quality conditions) and downgraded (by switching to more robust MCS or reverting to the initial most robust MCS), e.g., according to user/link/overall network conditions, to guarantee reliable RA data communications. This can be performed periodically by the TP or network. Alternatively, the UE can downgrade its MCS without signaling. The LA scheme can increase spectrum efficiency, support more users, and/or reduce latency, when possible.

Figure 1:
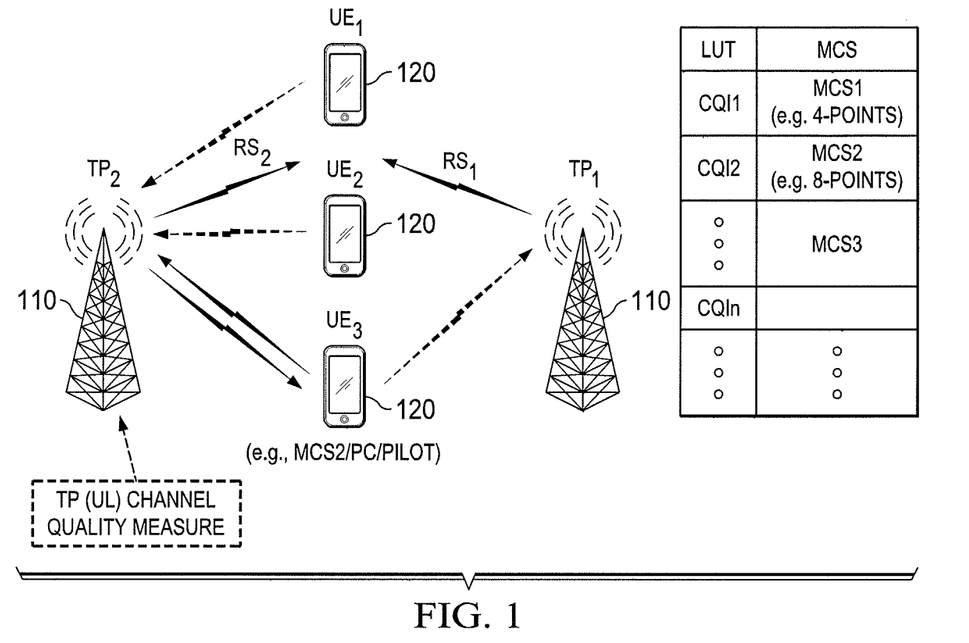
FIG. 1 shows an embodiment of LA with network terminal point (TP) operations.

FIG. 1 shows an embodiment of LA in UL grant-less RA with TP operations. Specifically, the TP performs UL based measurement for the UE and controls MCS accordingly. TP1 110 can measure interference generated by UEs 120 connected to TP1, as well as interference caused by transmissions between UEs 120 and other TPs, such as TP2 110. Neighboring TPs can also exchange this information with each other, either directly or through a third party. A TP 110 also measures the UL signal quality of the UEs linked to, or within a detection range of, the TP 110. The measurement can be performed, e.g., for initial access, sounding reference signal (SRS), or other signal quality indicators. The TP 110 can also measure the linked or close by UE's mobility and location. The UEs 120 are then categorized accordingly to such measures. For instance, fast-moving UEs 120 can be assigned a fixed MCS, e.g., QSPK, while static and/or slow moving UEs 120 are set for the LA scheme with changing MCS. A TP 110 also performs PC on a neighboring UE 120 based on long-term (LT) measurements, e.g., LT UL signal quality, LT UE mobility, LT UE location, or others.

Additionally, the TPs 110 or a network management entity can establish a LT MCS look-up table (LUT). The LT MCS LUT can be generated at the TPs or by a central controller at the network that forwards the LUT or its values to the TPs. The LT MCS LUT may include substantially fewer entries than used for short term LA. To establish the MCS LUT, a TP 110 estimates multiple CQI values based on PC strategy, and associates each CQI value with a suitable MCS. Each CQI value and its MCS can be added as an entry, e.g., a row value, in the LUT. Each entry in the LUT corresponds to an association between a CQI value and a MCS. This determines the strategy for selecting MCS for a UE 120 based on its measured CQI. During on-going communications, the TP/network uses the LUT to select the appropriate MCS for a UE 120 based on its measured CQI. For example, the UE 120 is assigned MCS1 at CQI1 measured levels, and is then upgraded to MCS2 when the CQI changes from CQI1 to CQI2. With similar logic, the UE 120 can be downgraded from MCS2 to MCS1 according to the measured changes in CQI levels. UE MCS upgrade and downgrade can be based on UE long-term measurement in the uplink and categorization of the UEs based on such measurements. For example, according to the measurement values, the UEs can be categorized as fast-moving (or high mobility) UEs, slow moving (or low mobility) UEs, or static UEs. Similarly, pilot adjustment as needed is also an option to provide better channel measurements at TP. The upgrade and downgrade may be achieved via TP signaling to the UEs 120. Radio Resource Control (RRC) signaling can be used for UE grouping and RA resource allocation. The signaling instructing an upgrade or downgrade may indicate a new MCS to switch to, the transmission power and optionally pilot reselection. The upgrade or downgrade of UE MCS based on the UL LT measurement may also be performed periodically.

Figure 2:
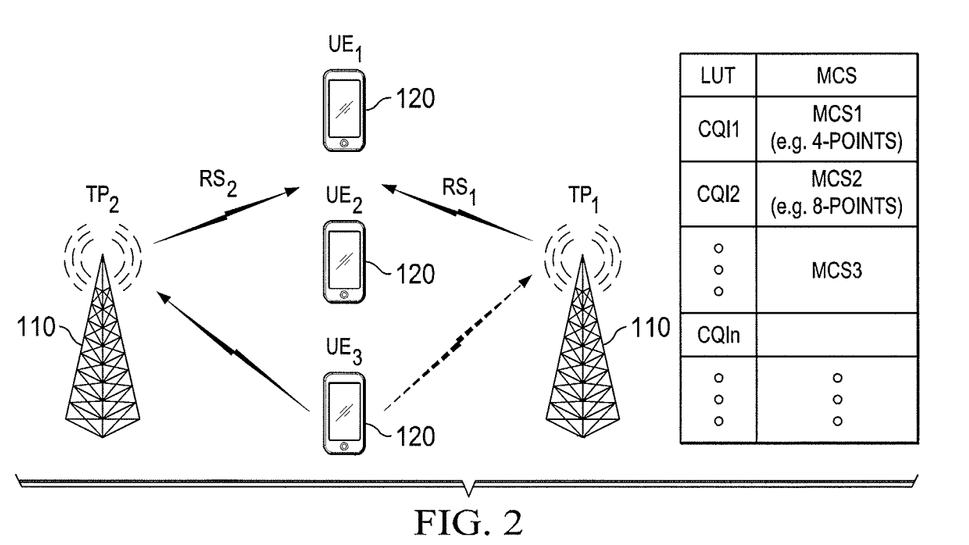
FIG. 2 shows an embodiment of LA with UE operations.

FIG. 2 shows an embodiment of LA in UL grant-less RA with UE operations. A UE 120 in the wireless system obtains resource allocation information, e.g., via RRC signaling, when UE power is on. During initial data access, the UE 120 can adjust the transmission power based on an outer loop power control (OLPC) scheme. The packet transmission can also be carried with the most robust MCS supported by the system. When a failed transmission is detected, the previous transmission is retransmitted in accordance with a ReTx protocol. The UE 120 can also perform MCS downgrade without signaling a neighboring TP 110/network in scenarios such as when unexpected events occur to the UE 110. For example, a static/slow-moving UE 110 with a higher MCS can initiate a MCS downgrade when the UE 110 determines that it has started to move at a faster speed but a neighboring or other TP 110 has no timely information of the UE. In another example scenario, a UE 120 with higher MCS can downgrade MCS for certain traffic/application that requires higher reliability. In yet another scenario, a UE 120 with higher MCS can go downgrading MCS before its maximum retransmission times are reached.

Figure 3:
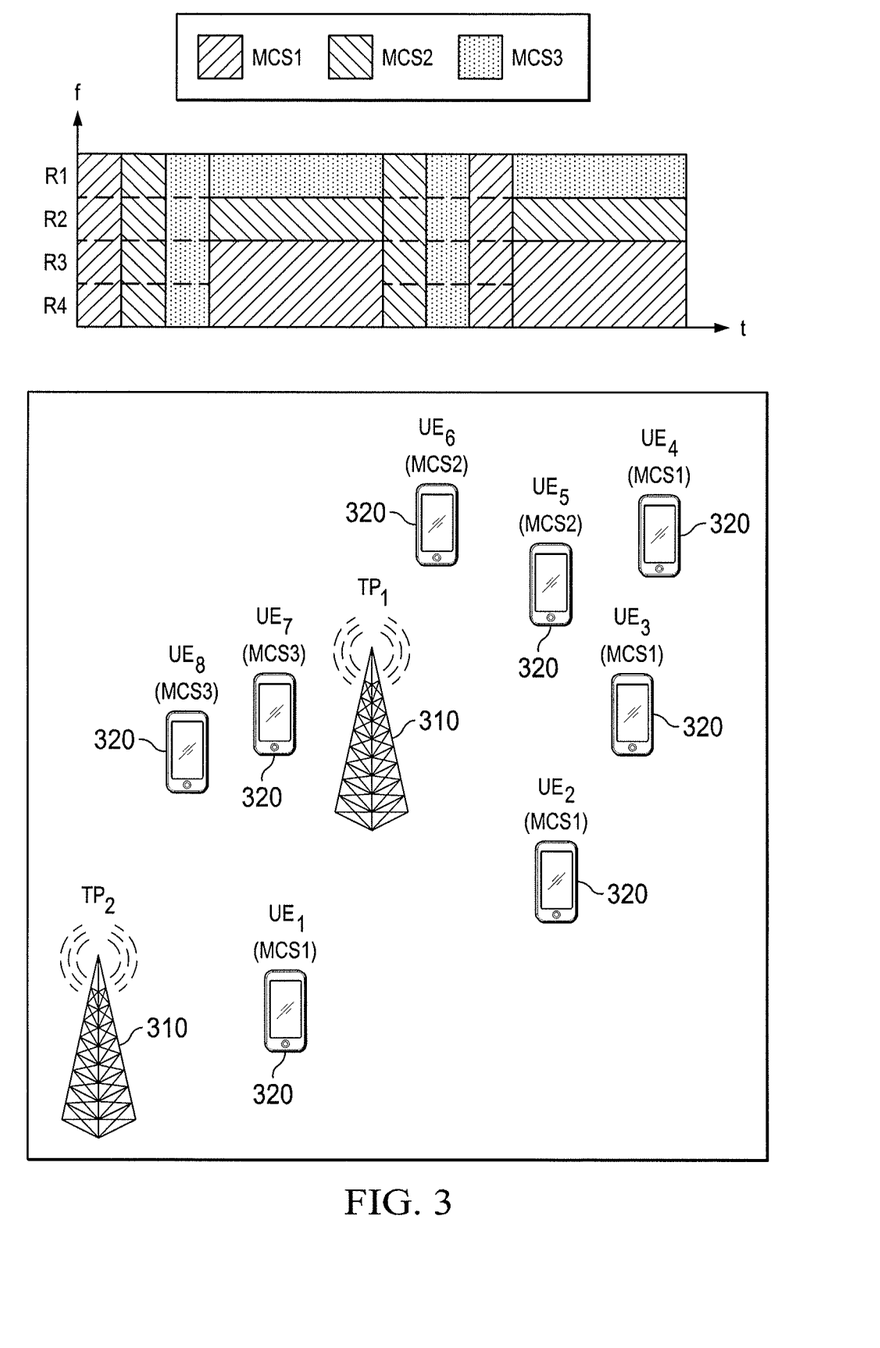
FIG. 3 shows an embodiment of UE RA resource allocation.

FIG. 3 shows an embodiment of UE RA resource allocation, which may be implemented with the LA scheme in UL grant-less RA. In a first implementation option, the UE MCS grouping is obtained by grouping the UEs 320 that share the same MCS. The UEs in a particular MCS grouping access the same resource, e.g., same bandwidth region or same designated Transmission Time Interval (TTI). The RA resources are divided into resource block, each block defined by a frequency and time boundaries. Each resource block can be allocated to serving different MCS groups (e.g., MCS1, MCS2, and MCS3). Each MCS group includes one or more UEs 320. The UEs 320 with same MCS access the same resource region. The resource allocations for the UE MCS groups can be static, semi-static or periodically updated or upon determining that the resource allocation is needed, e.g., based on signal quality, UE mobility, and/or other criteria. Such an allocation scheme can reduce the detection/search complexity. In a second implementation option, the UEs 320 share all the RA resources, e.g., the entire bandwidth or transmission time. In this case, the TPs 310 have the capability to decode mixed MCSs from UEs 320 in different UE MCS groups in a single TTI. Such an allocation scheme can increase resource utilization.

Figure 4:
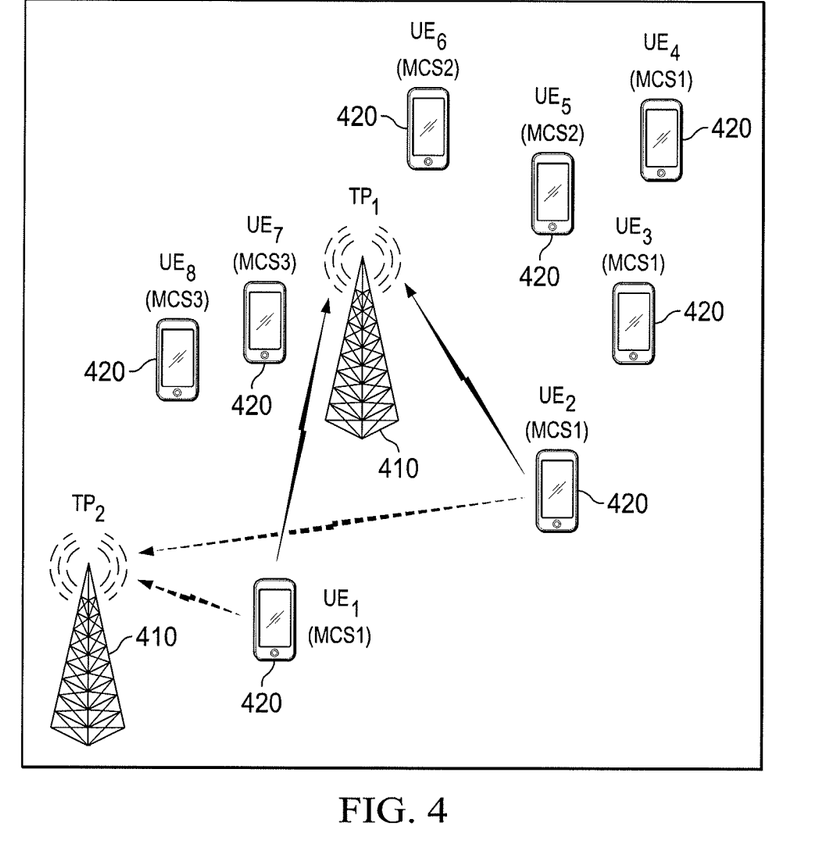
FIG. 4 shows an embodiment of power control (PC) for RA with grant-less scheduling.

FIG. 4 shows an embodiment of PC for RA with grant-less scheduling. The network TPs 410 have knowledge of the location of the UEs, for instance by measuring UE sounding channel. The TPs 410 surrounding the UEs 420 can exchange the LT measurements with each other. For initial access, a UE 420 can notify the network/TP of its maximum transmission power and/or power headroom. UL PC criteria can then be used to perform PC. The criteria include achieving maximum or highest possible MCS while minimizing potential interference. For example, the edge UEs 420, UE1 and UE2, may have different transmission power when applying PC, but the same MCS due to their different interference levels with respect to TP2. Further, different mobility UEs 420 can be assigned different power margins for LA. An additional margin can also be considered for LA due to fast fading channel characteristics. In one PC exemplary implementation given a block error ratio (BLER), a number of assigned resource blocks (RBs), and predefined power offset, $\Delta i$, and CQIi for user i, the highest MCSj is chosen such that $\text{Interf}(P(\text{MCSj})+\Delta j)<=\text{Interf-max}$ and $P(\text{MCSj})+\Delta j<=\text{Pmax}$, where $P(\text{MCSj})$ is UE transmission (Tx) power, Pmax is UE maximum Tx power, and Interf-max is the allowable maximum interference to the closest neighbor.

In the first implementation option described above for UE RA resource allocation based on UE MCS grouping, SC can be configured on some TTIs and/or time-frequency resources with a less robust MCS, which may be suitable for sufficiently high signal quality levels for transmission. The configuration can be implemented in a semi-static manner. A retransmission protocol can also be used, where the UE performs the retransmission with the same MCS. The retransmission can be performed with a random back-off time, for the same or different content. After reaching a predefined number of maximum retransmission times, the MCS can be downgraded to a lower (most robust) MCS, which may be suitable for lower or lowest signal quality levels acceptable for transmission. The failed packet is dropped after the retransmissions of the same MCS and the SC retransmissions. There can be one or more retransmission attempts in the SC. According to this ReTx protocol, the TP detects signals in different MCS resource regions. The UEs in each MCS region can be detected separately. The UEs that are not detected in all the MCS region except the most robust MCS (e.g., MCS1) are detected in the SC. Chase combining (CC) or incremental redundancy (IR) can be used in some cases to reduce failed detection signals. If a UE can be detected successfully, the TP can take advantage of it to help detect other UEs. For example, successive interference canceller (SIC) and hybrid automatic repeat request (HARQ) combining is possible. For ReTx, the TP can adjust the MCS and transmission power (and optionally the pilot) for a UE as needed, and send the updates to the UE. The TP can also apply MCS downgrade for failed transmissions.

Figure 5:
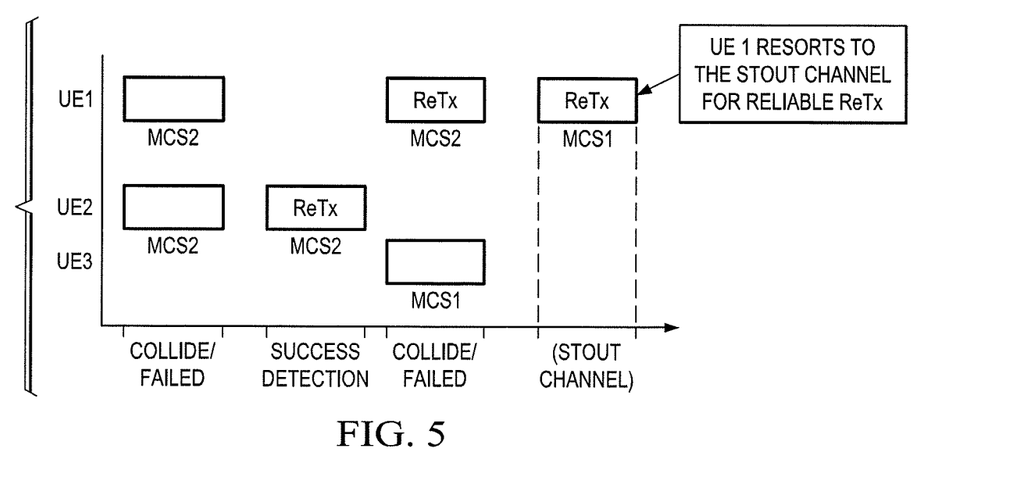
FIG. 5 shows an embodiment of a retransmission protocol for RA with grant-less scheduling.

FIG. 5 shows an embodiment of a ReTx protocol according to second implementation option described above for UE RA resources shared by all UEs. The UE can perform retransmission with the same MCS, as shown for UE1 and UE2 with MCS2. The UE can retransmit in the SC with an indication of its previous failures after it reaches the predefined maximum retry times in the original RA resources, as shown for UE1. Also, the UE can retransmit one or more times in the SC. The indication may be a retransmission indicator or flag. This is to distinguish the data from regular new transmissions. The failed packet is then dropped after all retransmissions. The SC can also be used for new user data transmission. As described above, the TP is able of detecting signals for mixed MCSs. The TP receiver searches for all users. However, in the SC, detection of only the most robust MCS (e.g., MCS1) is needed, as shown for UE1 retransmission. In some cases to reduce failed detection signals, CC or IR can be used. If one UE can be detected successfully, the TP can take advantage of the detected UE to help detect other UEs, for example using SIC and HARQ. The TP can also adjust the MCS, transmission power, and optionally the pilot for a UE on demand, and send updates to the UE. The TP can also apply MCS downgrade for failed transmissions.

Figure 6:
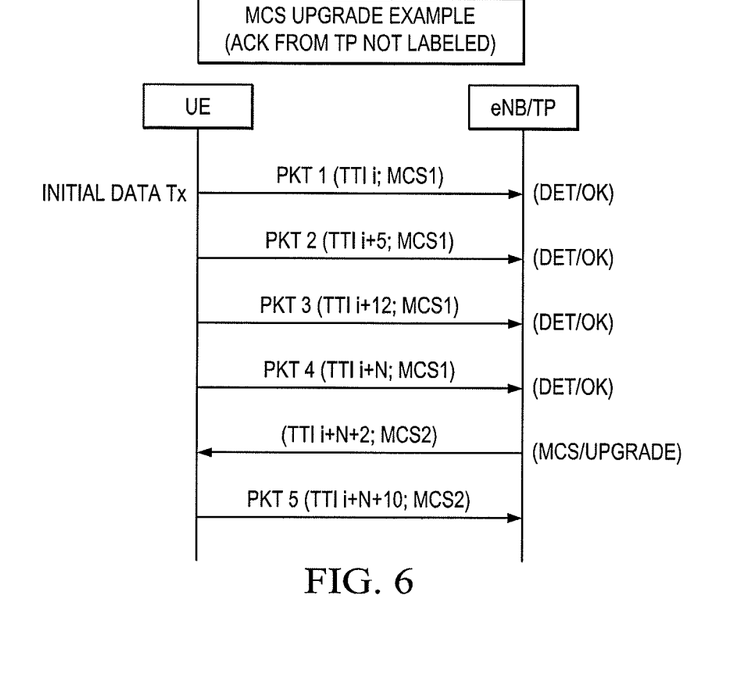
FIG. 6 shows a protocol diagram of an embodiment method for network/TP originated MCS upgrade in RA.

FIG. 6 shows a protocol diagram of an embodiment method for TP originated MCS upgrade in RA. The UE starts by sending an initial data transmission or packet to the TP, e.g., eNB, at a TTI i (where i designates an instance in time units). The UE then sends a second packet at TTI i+5 (5 indicates additional time with respect to i, e.g. 5 seconds), a third packet at TT i+12, and a fourth packet at TTi i+N (N is an integer >12). The packets are sent using a robust MCS (e.g., MCS1). Upon detecting each of the packets successfully, the TP/eNB returns an acknowledgement (ACK) to the UE (not shown). After a number of successive packets are detected successfully (e.g. 4 in the illustrated example), the TP/eNB may determine that the signaling conditions for the UE are above a threshold and based on that determination, the TP can upgrade the MCS to improve efficiency (as shown for the transmission at TTI i+N+2). The MCS upgrade decision may be made by TP upon satisfying predefined good signal condition criteria. These criteria, which may include factors such as receiving successfully a predefined number of subsequent packets, may be determined on a UE to UE basis, so that only UEs demonstrating the sufficiently reliable channels are impacted. As illustrated in FIG. 6, after being informed of the MCS upgrade, the UE can send a fifth transmission using the upgraded MCS (e.g., MCS2).

Figure 7:
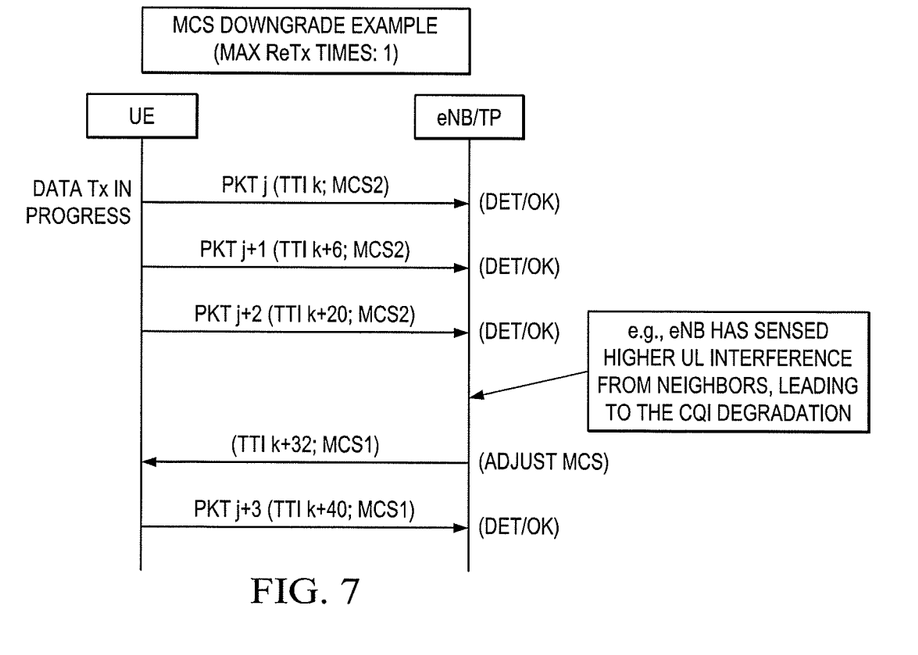
FIG. 7 shows a protocol diagram of an embodiment method for network/TP originated MCS downgrade in RA.

FIG. 7 shows a protocol diagram of another embodiment method for execution at a TP for a TP originated MCS downgrade in RA. The UE sends a data transmission (illustrated as packet j) to the TP, e.g., eNB, at a TTI k (where k designates an instance in time units) using MCS2. This transmission is successfully detected by the TP/eNB. The UE then sends a second packet j+1 at TTI k+6 (e.g. 6 seconds after time instance k) using the same MCS2, and a third packet j+2 at TTI k+20 using the same MCS2, which are both successfully detected at the TP/eNB. Nothing in the transmissions from the UE necessarily indicates that a change in the MCS is warranted. However, after receiving a number of transmissions successfully with MCS2, the TP/eNB detects a higher UL interference from any UE within proximity or detection range of the TP/eNB, which leads to channel quality degradation. In response, the TP/eNB decides to preemptively downgrade the MCS used by the UE to MCS1 to avoid transmission problems. The TP sends the MCS downgrade instruction to the UE at TTI k+32. Next, the UE sends a new packet j+3 at TTI k+40 using the more robust MCS1.

Figure 8:
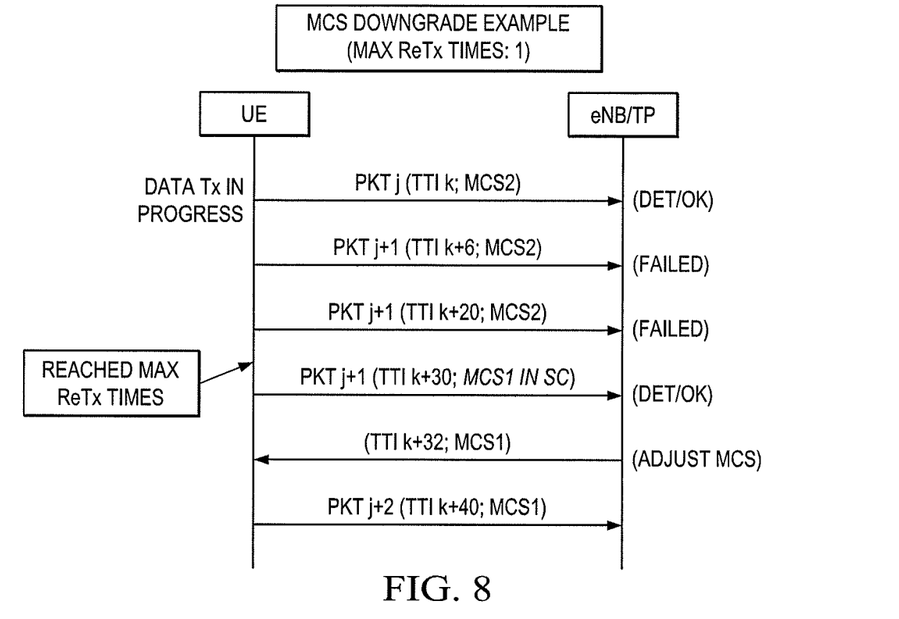
FIG. 8 shows a protocol diagram of another embodiment method for UE originated MCS downgrade in RA.

FIG. 8 shows a protocol diagram of an embodiment method for a UE originated MCS downgrade in RA. As illustrated. The UE sends a data transmission (packet j) to the TP, e.g., eNB, at a TTI k using MCS2. This transmission is successfully detected by the TP/eNB. The UE then sends a second packet j+1 at TTI k+6 (e.g. 6 seconds after time instance k) using the same MCS2. When this transmission fails, e.g., the UE does not receive an ACK response from the TP/eNB, the UE retransmits packet j+1 at TTI k+20 using MCS2. When this retransmission fails, again the UE does not receive an ACK from the TP. The lack of ACK allows the UE to determine that the transmission is unsuccessful. Upon reaching a predefined number of failed retransmissions, the UE changes the MCS to MCS1 and retransmits packet j+1 at TTI k+30 using SC with MCS1. MCS1 is more robust than MCS2. Retransmitting the packet on the SC with MCS1, which is a more robust channel than MCS2 or a most robust MCS, serves to trigger the MCS downgrade and indicates a request of the downgrade to the TP/eNB or network. Upon detecting this retransmission in the SC (with MCS1 by default), the TP/eNB downgrades the MCS for the UE from MCS2 to MCS1 and sends an ACK back to the UE (not shown). A downgrade instruction (or confirmation as the case may be) is thus sent to the UE at TTI k+32. The UE sends a new packet j+2 at TTI k+40 using MCS1.

Figure 9:
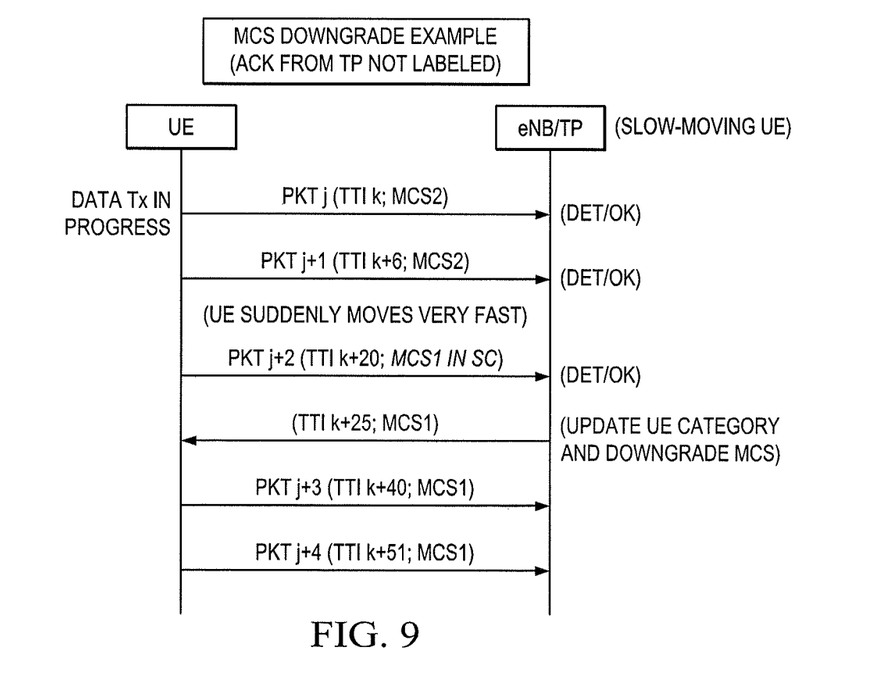
FIG. 9 shows a protocol diagram of another embodiment method for UE originated MCS downgrade in RA.

FIG. 9 shows a protocol diagram of another embodiment method for UE originated MCS downgrade in RA. The UE sends a data transmission (packet j) to the TP, e.g., eNB, at a TTI k using MCS2, which is successfully detected by the TP/eNB. The UE subsequently sends a second packet j+1 at TTI k+6 using the same MCS2, which is also successfully detected by the TP/eNB. The UE mobility then changes its mobility state. In the illustrated embodiment, a slow moving UE transitions to a fast movement state. The UE is aware of its change in mobility and network entities may not yet be aware of this change. The UE transmits the next packet j+2 at TTI k+20 in the SC with the MCS1, which as discussed above can represent the most robust MCS available. Transmitting the packet on the SC with MCS1 serves to trigger the MCS downgrade and indicates a request for the downgrade to the TP/eNB or network. Upon receiving packet j+2 at the TP/eNB in the SC with MCS1, the TP/eNB is informed of the change in UE mobility or signal condition, and hence updates the UE category and downgrades its MCS. A downgrade instruction can be sent to the UE. The UE can treat this as an acceptance of the request to move to MCS1. When the UE transmits packet j+3 at TTI k+40 it does so using MCS1. The UE will continue transmitting using MCS, as shown by the transmission packet j+4 at TTI k+51, until a MCS upgrade is triggered, typically by the TP or other network entity.

In other embodiments, a UE can initiate an MCS downgrade after detecting a LA condition associated with the UE transmission qualities and application QoS. For instance, the UE downgrades the MCS when more reliable transmission is needed for a traffic application. In an example, the UE initiates the MCS downgrade upon determining a quality of service (QoS) requirement for an application of the UE that requires a more robust MCS.

In further embodiments, one of the entities participating in the grant free wireless communication uses a Modulation and Coding Scheme (MCS) to transmit data. The node may be a UE or a TP that initiates a change in MCS based on a non-link factor. For instance, the non-link factor can be the determination of mobility (move) or change in mobility of the UE, a launch of an application of the UE, a foreknowledge of an expected or likely change in channel characteristics, or other factors that require change of MCS, e.g., to a more robust MCS, that may not be associated with link conditions between the UE and TP. When the node (UE or TP) determines according to the non-link based factor that a new MCS should be used in place of a current MCS (e.g., the new MCS is more robust than the current MCS), the node instructs a grant free transmission controller to use the new MCS for subsequent grant free transmissions. In the case of UE initiated MCS change, the instructed grant free transmission controller may be a local controller at the UE. In the case of TP initiated MCS change, the instruction can be sent from the TP to a UE controller.

Figure 10:
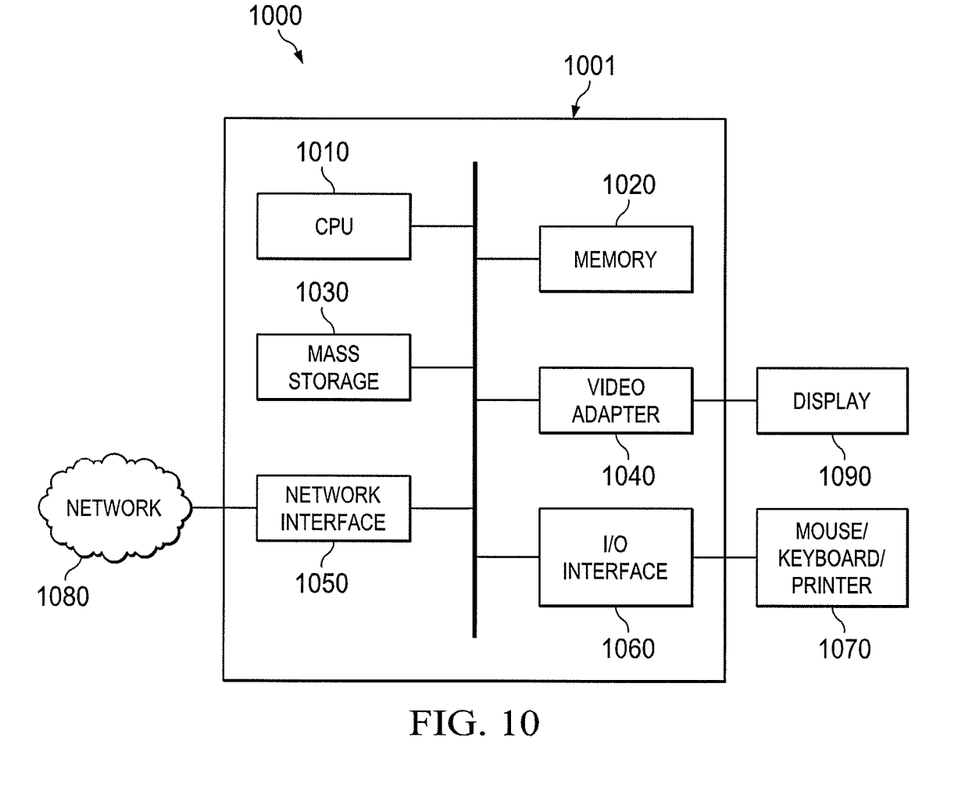
FIG. 10 is a diagram of a processing system that can be used to implement various embodiments.

FIG. 10 is a block diagram of a processing system 1000 that can be used to implement various embodiments. The processing system 1000 can be part of a TP or eNB, a UE, or other network devices. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 1000 may comprise a processing unit 1001 equipped with one or more input/output devices, such as a speaker, microphone, mouse, touchscreen, keypad, keyboard, printer, display, and the like. The processing unit 1001 may include a central processing unit (CPU) 1010, a memory 1020, a mass storage device 1030, a video adapter 1040, and an I/O interface 1060 connected to a bus. The bus may be one or more of any type of several bus architectures including a memory bus or memory controller, a peripheral bus, a video bus, or the like.

The CPU 1010 may comprise any type of electronic data processor. The memory 1020 may comprise any type of system memory such as static random access memory (SRAM), dynamic random access memory (DRAM), synchronous DRAM (SDRAM), read-only memory (ROM), a combination thereof, or the like. In an embodiment, the memory 1020 may include ROM for use at boot-up, and DRAM for program and data storage for use while executing programs. In embodiments, the memory 1020 is non-transitory. The mass storage device 1030 may comprise any type of storage device configured to store data, programs, and other information and to make the data, programs, and other information accessible via the bus. The mass storage device 1030 may comprise, for example, one or more of a solid state drive, hard disk drive, a magnetic disk drive, an optical disk drive, or the like.

The video adapter 1040 and the I/O interface 1060 provide interfaces to couple external input and output devices to the processing unit. As illustrated, examples of input and output devices include a display 1090 coupled to the video adapter 1040 and any combination of mouse/keyboard/printer 1070 coupled to the I/O interface 1060. Other devices may be coupled to the processing unit 1001, and additional or fewer interface cards may be utilized. For example, a serial interface card (not shown) may be used to provide a serial interface for a printer.

The processing unit 1001 also includes one or more network interfaces 1050, which may comprise wired links, such as an Ethernet cable or the like, and/or wireless links to access nodes or one or more networks 1080. The network interface 1050 allows the processing unit 1001 to communicate with remote units via the networks 1080. For example, the network interface 1050 may provide wireless communication via one or more transmitters/transmit antennas and one or more receivers/receive antennas. In an embodiment, the processing unit 1001 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for realizing device-to-device communication relay selection, comprising:
   receiving, by a user equipment, relay-related information sent by a relay node; selecting or configuring, by the user equipment, an access relay node; and
   in response to determining that the user equipment has not selected the access relay node, or the user equipment has already selected the access relay node and a measurement result that is obtained by the user equipment by performing a measurement on the relay-related information sent by the selected access relay node is less than a relay reselection device-to-device communication link threshold, the user equipment monitoring a relay reception resource pool and receiving the relay-related information sent by the relay node,
   wherein the relay-related information comprises at least one of:
   a relay usable time period of the relay node;
   a relay charging demand of the relay node.

2. The method of claim 1, wherein the network component is one of a base station or a network controller.

3. The method of claim 1, further comprising:
   before the assigning the first MCS, assigning, to the UE, an initial MCS of the second plurality of MCSs based on the second LUT and the UE;
   receiving, from the UE, an initial packet encoded using the initial MCS; and
   measuring the first link quality based on the received initial packet.

4. The method of claim 1, wherein the plurality of link qualities are a plurality of channel quality indicator (CQI) values.

5. The method claim 1, further comprising:
   before the assigning, measuring the first link quality associated with the UE; and after the assigning, transmitting the first MCS to the UE via a radio resource control (RRC) signal.

6. The method of claim 1, further comprising:
   measuring a second link quality associated with the UE, the second link quality being higher than the first link quality;
   assigning, by the network component to the UE, a second MCS of the first plurality of MCSs based on the first LUT and the second link quality, the second MCS being less robust than the first MCS; and
   receiving, from the UE, a second packet encoded using the second MCS.

7. The method of claim 6, further comprising:
   measuring a third link quality associated with the UE, the third link quality being lower than the first link quality;
   assigning, by the network component to the UE, a third MCS of the first plurality of MCSs based on the first LUT and the third link quality, the third MCS being more robust than the first MCS; and
   receiving, from the UE, a third packet encoded using the third MCS.

8. The method of claim 1, further comprising:
   transmitting, to the UE, a link adaptation (LA) condition associated with UE transmission or application quality, wherein the LA condition comprises one or more of a long-term link quality measurement, a mobility of the UE, or a quality of service (QoS) requirement for an application of the UE.

9. The method of claim 1, wherein the first LUT is used for slow link adaptation (LA), and the second LUT is used for short term LA.

10. A network component for link adaptation, the network component comprising:
    at least one processor; and
    a non-transitory computer readable storage medium storing programming for execution by the at least one processor, the programming including instructions for:
    establishing a first look-up table (LUT) associating a plurality of link qualities with a first plurality of modulation and coding schemes (MCSs);
    establishing a second LUT associating a plurality of user equipments (UEs) with a second plurality of MCSs, wherein a number of entries in the first LUT is fewer than a number of entries in the second LUT;

assigning, to a UE, a first MCS of the first plurality of MCSs based on the first LUT and a first link quality associated with the UE; and receiving, from the UE, a first packet in a grant free transmission, the first packet encoded using the first MCS assigned by the network component.

11. A method for realizing device-to-device communication relay selection, comprising:

sending or preconfiguring, by a network control node through broadcasting or dedicated signaling, a relay reception resource pool and/or a relay selection threshold, to make a user equipment receive relay-related information sent by a relay node and select or configure an access relay node; wherein the relay selection threshold comprises a relay reselection hysteresis value; and wherein the relay-related information comprises at least one of:

a relay usable time period of the relay node; and
a relay charging demand of the relay node.

12. The network component of claim 10, the programming further including instructions for:

before the assigning the first MCS, assigning, to the UE, an initial MCS of the second plurality of MCSs based on the second LUT and the UE;

receiving, from the UE, an initial packet encoded using the initial MCS; and measuring the first link quality based on the received initial packet.

13. A user equipment, comprising a processor and a storage device, wherein the storage device communicably connected with the processor and configured for storing processor-executable instructions executable by the processor; wherein the processor-executable instructions when executed by the processor causes the processor to perform a method for realizing device-to-device communication relay selection, wherein the method comprises:

receiving, by a user equipment, relay-related information sent by a relay node; and selecting or configuring, by the user equipment, an access relay node;

in response to determining that the user equipment has not selected the access relay node, or the user equipment has already selected the access relay node and a measurement result that is obtained by the user equipment by performing a measurement on the relay-related information sent by the selected access relay node is less than a relay reselection device-to-device communication link threshold, the user equipment monitoring a relay reception resource pool and receiving the relay-related information sent by the relay node, wherein the relay-related information comprises at least one of:

a relay usable time period of the relay node;
a relay charging demand of the relay node.

14. The network component of claim 10, the programming further including instructions for:

before the assigning, measuring the first link quality associated with the UE; and after the assigning, transmitting the first MCS to the UE via a radio resource control (RRC) signal.

15. The network component of claim 10, the programming further including instructions for:

measuring a second link quality associated with the UE, the second link quality being higher than the first link quality;

assigning, to the UE, a second MCS of the first plurality of MCSs based on the first LUT and the second link quality, the second MCS being less robust than the first MCS; and receiving, from the UE, a second packet encoded using the second MCS.

16. The network component of claim 15, the programming further including instructions for:

measuring a third link quality associated with the UE, the third link quality being lower than the first link quality;

assigning, to the UE, a third MCS of the first plurality of MCSs based on the first LUT and the third link quality, the third MCS being more robust than the first MCS; and receiving, from the UE, a third packet encoded using the third MCS.

17. The network component of claim 10, the programming further including instructions for:

transmitting, to the UE, a link adaptation (LA) condition associated with UE transmission or application quality, wherein the LA condition comprises one or more of a long-term link quality measurement, a mobility of the UE, or a quality of service (QoS) requirement for an application of the UE.

18. The network component of claim 10, wherein the first LUT is used for slow link adaptation (LA), and the second LUT is used for short term LA.

19. A non-transitory computer-readable device having instructions stored thereon that, when executed by a network component, cause the network component to perform operations, the operations comprising:

establishing a first look-up table (LUT) associating a plurality of link qualities with a first plurality of modulation and coding schemes (MCSs);

establishing a second LUT associating a plurality of user equipments (UEs) with a second plurality of MCSs, wherein a number of entries in the first LUT is fewer than a number of entries in the second LUT;

assigning, to a UE, a first MCS of the first plurality of MCSs based on the first LUT and a first link quality associated with the UE; and receiving, from the UE, a first packet in a grant free transmission, the first packet encoded using the first MCS assigned by the network component.

20. The non-transitory computer-readable device of claim 19, wherein the network component is one of a base station or a network controller.

21. The method of claim 1, wherein the first link quality is based on an uplink (UL) channel measurement of a reference signal, and wherein the reference signal comprises a sounding reference signal (SRS).

* * * * *